US 11,303,109 B2

(12) United States Patent
Montenegro et al.

(10) Patent No.: US 11,303,109 B2
(45) Date of Patent: Apr. 12, 2022

(54) POWER DISTRIBUTION SYSTEM LATERAL PROTECTION AND METHOD

(71) Applicant: S&C Electric Company, Chicago, IL (US)

(72) Inventors: Alejandro Montenegro, Chicago, IL (US); Michael G. Ennis, Evanston, IL (US)

(73) Assignee: S&C Electric Company, Chicago, IL (US)

( * ) Notice: Subject to any disclaimer, the term of this patent is extended or adjusted under 35 U.S.C. 154(b) by 0 days.

(21) Appl. No.: 17/005,385

(22) Filed: Aug. 28, 2020

(65) Prior Publication Data

US 2021/0075212 A1 Mar. 11, 2021

Related U.S. Application Data

(60) Provisional application No. 62/896,602, filed on Sep. 6, 2019.

(51) Int. Cl.
*H02H 7/22* (2006.01)
*H02H 1/00* (2006.01)

(52) U.S. Cl.
CPC ............ *H02H 7/22* (2013.01); *H02H 1/0007* (2013.01)

(58) Field of Classification Search
CPC .. H01H 31/003; H01H 33/022; H01H 33/125; H01H 33/53; H01H 33/662; H01H 33/66207; H01H 33/664; H01H 33/666; H01H 33/6661; H01H 33/6662; H01H 9/167; H01H 9/168; H02H 1/0007;

(Continued)

(56) References Cited

U.S. PATENT DOCUMENTS 6,337,613 B1   1/2002 Grelier et al.
6,496,342 B1  12/2002 Horvath et al.
(Continued)

FOREIGN PATENT DOCUMENTS

EP          3247011 A1 * 11/2017
WO   WO-2004068637 A2 *  8/2004 ............. H01F 27/04
WO       2011/032585 A1    3/2011

OTHER PUBLICATIONS

International Search Report and Written Opinion for International Application No. PCT/US2000/048316 dated Nov. 20, 2020. (9 pages).

*Primary Examiner* — Jared Fureman
*Assistant Examiner* — Nicolas Bellido

(57) ABSTRACT

A fault protection system for providing protection from fault current for components and devices on a lateral line proximate to a distribution transformer in a power distribution network. The system includes a single-phase recloser having a vacuum interrupter that is controlled by a controller. In one embodiment, the recloser has an insulating body that is molded in combination with an insulating body of a bushing that is connected to the distribution transformer. In this embodiment, the controller can be powered by a current transformer within the recloser. In another embodiment, the recloser is mounted to a utility pole separate from the distribution transformer, where the controller is powered by the low voltage side of the transformer and the current transformer is eliminated. An isolated power supply is provided between the transformer and the controller to provide voltage isolation.

14 Claims, 2 Drawing Sheets

(58) Field of Classification Search
CPC .... H02H 1/003; H02H 1/0038; H02H 1/0061; H02H 7/04; H02H 7/042; H02H 7/055; H02H 7/22; H02H 7/222; H02J 11/00; H02J 13/00022; H02J 13/0075; H02J 3/00; H02J 3/00125; H02J 50/001
See application file for complete search history.

(56) References Cited

U.S. PATENT DOCUMENTS

| | | | |
|---|---|---|---|
| 2002/0179571 A1* | 12/2002 | Rhein | H01H 33/6662 |
| | | | 218/7 |
| 2006/0084419 A1 | 4/2006 | Rocamora et al. | |
| 2008/0217148 A1 | 9/2008 | Kowalyshen et al. | |
| 2014/0362486 A1 | 12/2014 | O'Regan et al. | |
| 2020/0191841 A1* | 6/2020 | Lakirovich | G01R 31/54 |
| 2020/0300905 A1* | 9/2020 | O'Regan | G01R 31/08 |
| 2020/0411260 A1* | 12/2020 | Montich | H01H 33/53 |
| 2021/0215772 A1* | 7/2021 | Mauney | G01R 31/62 |

\* cited by examiner

POWER DISTRIBUTION SYSTEM LATERAL PROTECTION AND METHOD

BACKGROUND

Field

The present disclosure relates generally to a fault protection system for providing protection from fault current for components and devices on a lateral line in a power distribution network and, more particularly, to a fault protection system for providing protection from fault current for components and devices on a lateral line proximate a distribution transformer.

Discussion of the Related Art

An electrical power distribution network, often referred to as an electrical grid, typically includes a number of power generation plants each having a number of power generators, such as gas turbines, nuclear reactors, coal-fired generators, hydro-electric dams, etc. The power plants provide power at a variety of medium voltages that are then stepped up by transformers to a high voltage AC signal to be connected to high voltage transmission lines that deliver electrical power to a number of substations typically located within a community, where the voltage is stepped down to a medium voltage for distribution. The substations provide the medium voltage power to a number of three-phase feeders including three single-phase feeder lines that carry the same current, but are 90° apart in phase. A number of lateral lines are tapped off of one of the single-phase feeder lines that provide the medium voltage to various distribution transformers, where the voltage is stepped down to a low voltage and is provided to a number of loads, such as homes, businesses, etc.

Periodically, faults occur in the distribution network as a result of various things, such as animals touching the lines, lightning strikes, tree branches falling on the lines, vehicle collisions with utility poles, etc. Faults may create a short-circuit that increases the current on the network to be several times above the normal current along the fault path. This amount of current could cause the electrical lines to significantly heat up and possibly melt, and also could cause mechanical damage to various components in the substation and in the network.

A power distribution network of the type referred to above typically employ one or more fuses positioned along each lateral line, for example, proximate to a tap location where the lateral line is connected to the feeder and on a distribution line tapped off of the lateral line. A fuse is an independent electrical device that is not in communication with other components or devices in the network, where the fuse creates an open circuit if an element within the fuse heats up above a predetermined temperature as a result of high fault current so as to prevent short-circuit faults on the lateral line from affecting other parts of the network, and thus, the fuse is a single shot device.

Better fault control could be provided if the fuse was replaced with a smart switching device, such as a single-phase recloser, that is able to measure voltage and current, communicate with other devices, open a switch in response to fault current and provide other recloser operations. Thus, personnel would not need to be dispatched to replace the fuse if it is operated. Smart switching devices for this purpose are known in the art, but are expensive, thus making it economically unfeasible to replace the many fuses in the network with such devices. For example, known smart switching devices of this type require their own power supply, such as a current transformer or a voltage transformer sometimes in combination with a battery pack, that is necessary to power the electronics and sensors that measure the current and voltage. However, these power sources are a major part of the expense of the smart device.

SUMMARY

The following discussion discloses and describes a fault protection system for providing protection from fault current for components and devices on a lateral line proximate a distribution transformer in a power distribution network. The system includes a single-phase recloser having a vacuum interrupter or other switching device that is controlled by a controller. In one embodiment, the recloser has an insulating body that is molded in combination with an insulating body of a bushing that is connected to the distribution transformer. In this embodiment, the controller is powered by a current transformer within the recloser, although other techniques can be provided for powering the recloser because of its proximity to a frame of the transformer, such as using capacitive current. In another embodiment, the recloser is mounted to a utility pole separate from the distribution transformer, where the controller is powered by the low voltage side of the distribution transformer and the current transformer is eliminated. An isolated power supply is provided between the transformer and the controller to provide voltage isolation.

Additional features of the disclosure will become apparent from the following description and appended claims, taken in conjunction with the accompanying drawings.

DETAILED DESCRIPTION OF THE EMBODIMENTS

The following discussion of the embodiments of the disclosure directed to a fault protection system for providing protection from fault current for components and devices on a lateral line proximate a distribution transformer in a power distribution network, where the protection system includes a single-phase recloser molded to a bushing coupled to the transformer or a single-phase recloser having a controller that is powered by the transformer is merely exemplary in nature, and is in no way intended to limit the invention or its applications or uses.

Figure 1:
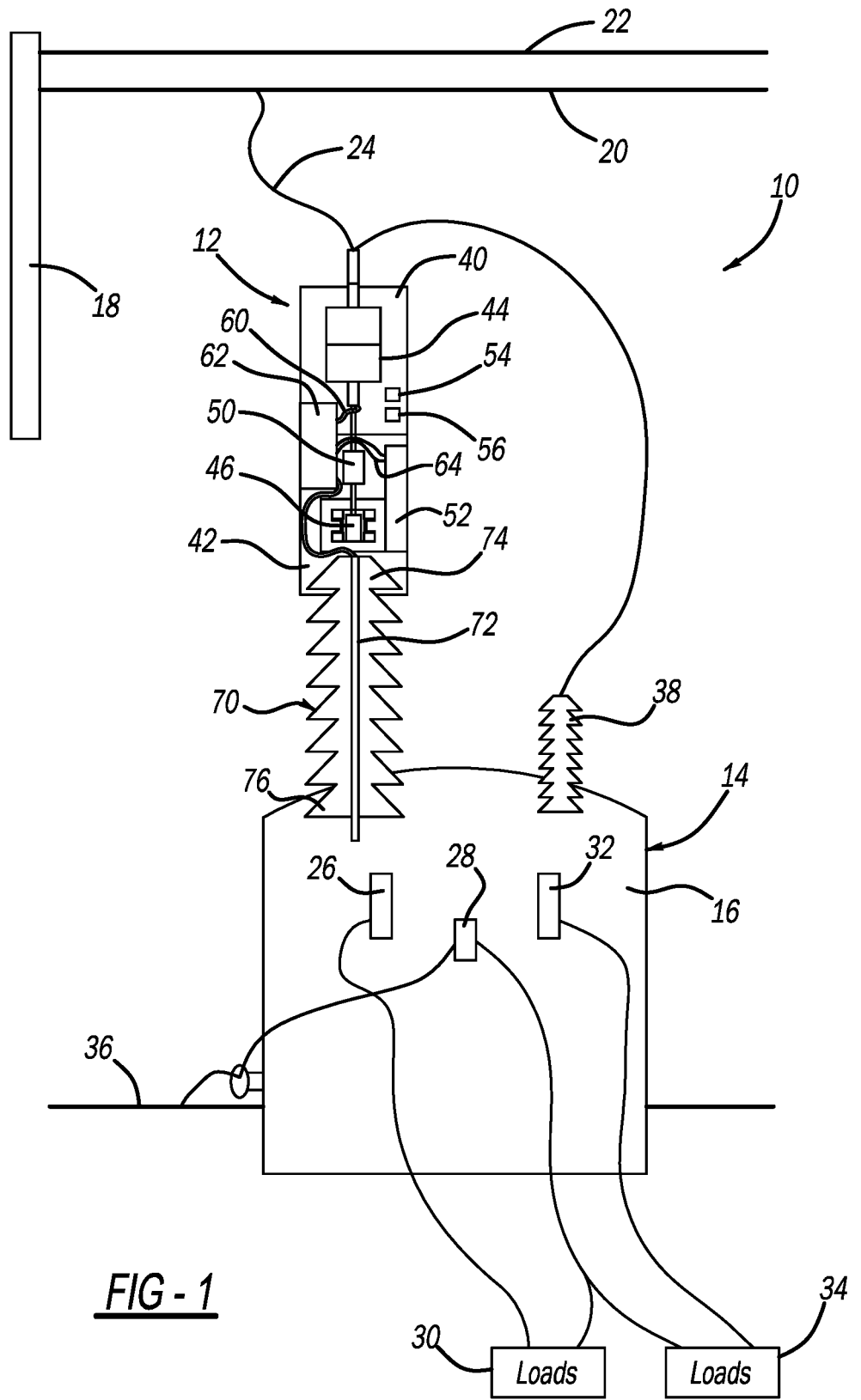
FIG. 1 is a schematic illustration of a fault protection system for providing protection from fault current for components and devices on a lateral line proximate a distribution transformer in a power distribution network and including a single-phase recloser molded to a bushing coupled to the transformer.

FIG. 1 is a schematic type drawing of a fault protection system 10 that includes a smart switching device 12, such as a single-phase recloser or other switching device suitable for the purposes discussed here, and a distribution transformer 14 having an outer can 16 that is metallic and usually electrically coupled to ground or neutral. In this non-limiting embodiment, the protection system 10 is mounted to a utility pole 18 at a location where a single-phase lateral line 20 is coupled off of another electrical line 22, such as a feeder. The transformer 14 is electrically coupled to the lateral line 20 through the switching device 12 and by a power line 24. The power line 24 is also electrically coupled to an arrester 38 mounted to the body 16 of the transformer 14 to provide lightning protection. The transformer 14 steps down the medium voltage on the lateral line 20 to a lower voltage, and, in this example, provides 120 volt power at a terminal 26 or 32 and a ground terminal 28 to power loads 30 and 34 and 240 volt power between terminals 26 and 32, where the ground terminal 28 is electrically coupled to a neutral line 36 in most applications.

The switching device 12 includes an upper insulating housing 40 and a lower insulating housing 42. A vacuum interrupter 44 is provided in the upper housing 40 and is coupled to an actuator 46, such as a solenoid, in the lower housing 42 by a coupler 50. The actuator 46 is controlled by a controller 52 also located in the lower housing 42 to cause the actuator 46 to open and close the vacuum interrupter 44 to prevent or allow current flow to the transformer 14 for fault protection in a manner well understood by those skilled art. The switching device 12 also includes sensors 54 for measuring the current, where the controller 52 processes the measurement signals and controls the position of the vacuum interrupter 44, and a transceiver 56 for transmitting data and messages to a control facility (not shown) and/or to other switch devices, reclosers and components. When the vacuum interrupter 44 is closed current is provided on line 60 to a current transformer 62 that harvests power therefrom and provides power to the controller 52 on line 64. The operation of the switching device 12 as described so far is well understood by those skilled in the art.

The transformer 14 includes a bushing 70 having an internal conductor 72 and an outer insulation body 74, where the bushing 70 can be made of any suitable material, such as porcelain, and where the internal conductor 72 is electrically coupled to the high voltage coil (not shown) in the transformer 14. The bushing 70 is a known part of a distribution transformer, but in this embodiment it is also used to secure the switching device 12 to the transformer 14, where the length of the bushing 70 may need to be extended beyond known designs. Particularly, a top end 74 of the bushing 70 is molded into the lower housing 42 and a bottom end 76 is secured to the can 16. Therefore, the bushing 70 and the switching device 12 can be manufactured as a single unit and then attached to the transformer 14. In another embodiment, instead of the switching device 12 being mounted to the top end 74 of the bushing 70, the switch device 12 can be completely molded inside of the bushing 70, thus saving further cost and reducing space constraints. In the known designs, the switching device 12 would not be used and would be replaced by a fuse that would be connected to the bushing 70 by an electrical line.

Figure 2:
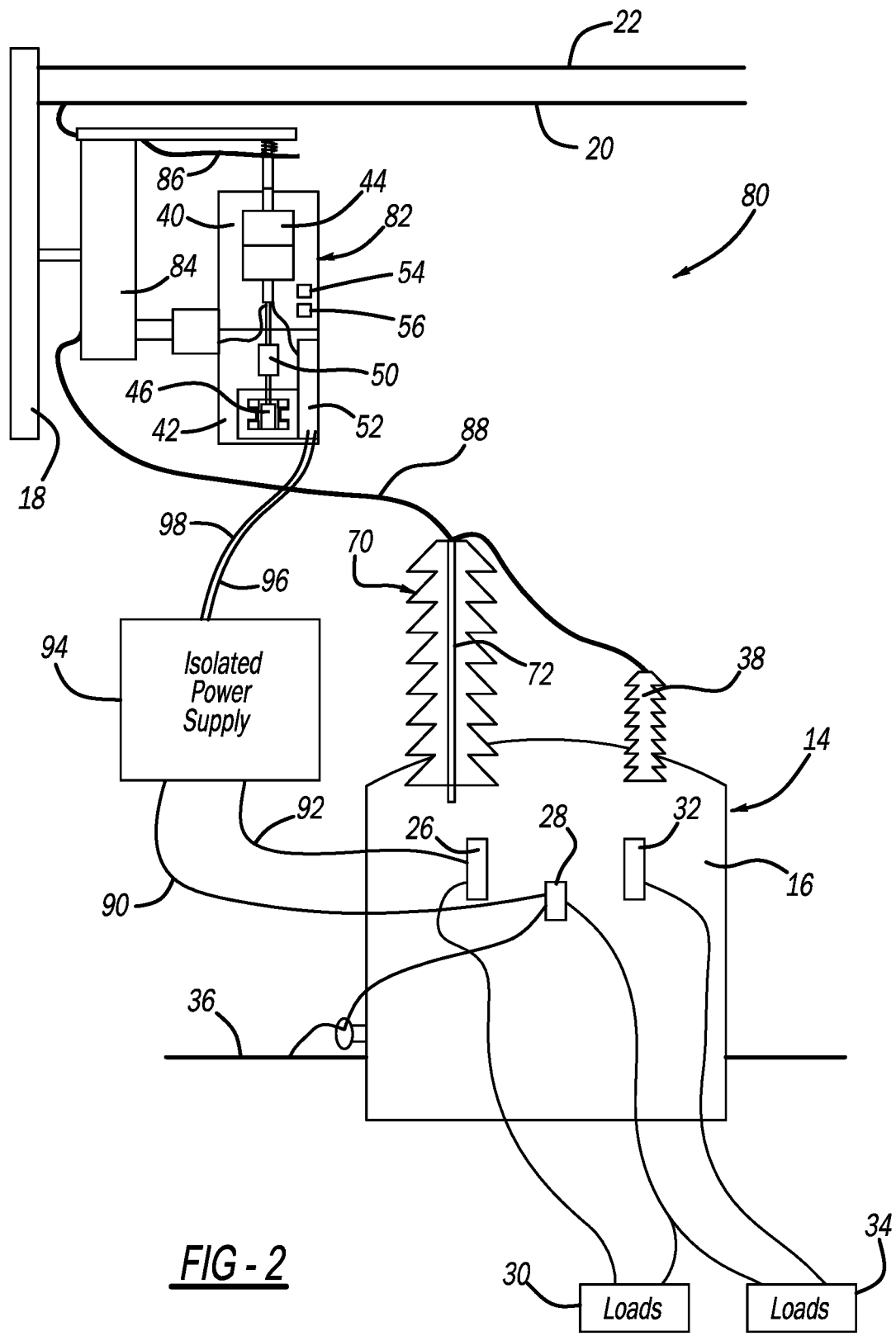
FIG. 2 is a schematic illustration of a fault protection system for providing protection from fault current for components and devices on a lateral line proximate a distribution transformer in a power distribution network and including a single-phase recloser having a controller that is powered by the transformer through an isolated power supply.

FIG. 2 is a schematic type drawing of a fault protection system 80 that is similar to the protection system 10, where like elements are identified by the same reference number. In this design, the smart switching device 12 is replaced with a smart switching device 82 that does not include a current transformer for providing power to the controller 52, where the switching device 82 replaces a fuse in the standard design. Further, the switching device 82 is not connected to the can 16 of the transformer 14, but is connected to the utility pole 18 by an L-shaped cut-out mounting 84. A power line 86 is connected to the lateral line 20 and a top contact of the vacuum interrupter 44 and a power line 88 is connected to the bottom contact of the vacuum interrupter 44 and the internal conductor 72 of the bushing 70 and the arrester 38. In this embodiment, the controller 52 is powered by the transformer 14 instead of the current transformer 62, which saves cost and reduces weight. Particularly, lines 90 and 92 are electrically coupled to the terminals 26 and 28 in the transformer 14 and to an isolated power supply 94. The power supply 94 is electrically coupled to the controller 52 by lines 96 and 98. The power supply 94 provides electrical isolation between the high voltage in the switch device 82 and the low voltage at the terminals 26 and 28. The isolated power supply 94 can be any suitable power supply for the purposes discussed herein, such as a fiber, ultrasound, radio frequency, small isolation transformer, etc.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. A fault protection system for providing protection from fault current in a power distribution network, the system comprising:
    a utility pole;
    a lateral line connected to the feeder and the utility pole;
    a switching device including a switch that is electrically coupled to the lateral line, the switch being switchable to allow and block current flow through the switching device;
    a distribution transformer mounted to the utility pole and receiving a power signal from the switching device when the switch is closed and not receiving the power signal from the switching device when the switch is open; and wherein,
    the distribution transformer includes a bushing having an internal conductor and an outer insulating body and the switching device includes an outer insulating body, and wherein the insulating bodies of the bushing and the switching device are molded together.

2. The system according to claim 1 wherein the switching device is powered by the distribution transformer through an isolated power supply.

3. The system according to claim 1 wherein the switch is a vacuum interrupter and the switching device includes a current sensor and a controller.

4. The system according to claim 3 wherein the switching device includes a current transformer that powers the controller.

5. The system according to claim 3 wherein the controller receives power from the distribution transformer.

6. The system according to claim 5 further comprising an isolated power supply configured to electrically isolate the controller from a lateral line voltage at the switching device.

7. The system according to claim 5 further comprising an isolated power supply configured to electrically isolate the controller from a high voltage at the switching device.

8. The system according to claim 1 wherein the switching device is a single-phase recloser.

9. A fault protection system for providing protection from fault current in a power distribution network, the system comprising:

a switching device including a switch that is switchable to allow and block current flow through the switching device, the switching device including an outer insulating body; and a distribution transformer receiving a power signal from the switching device when the switch is closed and not receiving the power signal from the switch device when the switch is open, the distribution transformer including a bushing having a center conductor and an outer insulating body, wherein the insulating bodies of the bushing and the switching device are molded together.

10. The system according to claim 9 wherein the switching device is a single-phase recloser including a current sensor and a controller and the switch is a vacuum interrupter.

11. The system according to claim 10 wherein the switching device includes a current transformer that powers the controller.

12. A protection system for providing protection from fault current in a power distribution network, the system comprising:

a switching device including a switch that is switchable to allow and block current flow through the switching device;

a distribution transformer receiving a power signal from the switching device when the switch is closed and not receiving the power signal from the switching device when the switch is open, wherein the switching device is powered by the distribution transformer; and wherein, the distribution transformer includes a bushing having an internal conductor and an outer insulating body and the switching device includes an outer insulating body, and wherein the insulating bodies of the bushing and the switching device are molded together.

13. The system according to claim 12 wherein the switching device is a single-phase recloser including a current sensor and a controller and the switch is a vacuum interrupter.

14. The system according to claim 13 wherein the controller receives power from the distribution transformer.

* * * * *